March 3, 1936.                H. G. SCHAEFER                2,032,721
                                 VEHICLE
                           Filed July 10, 1933        3 Sheets-Sheet 1
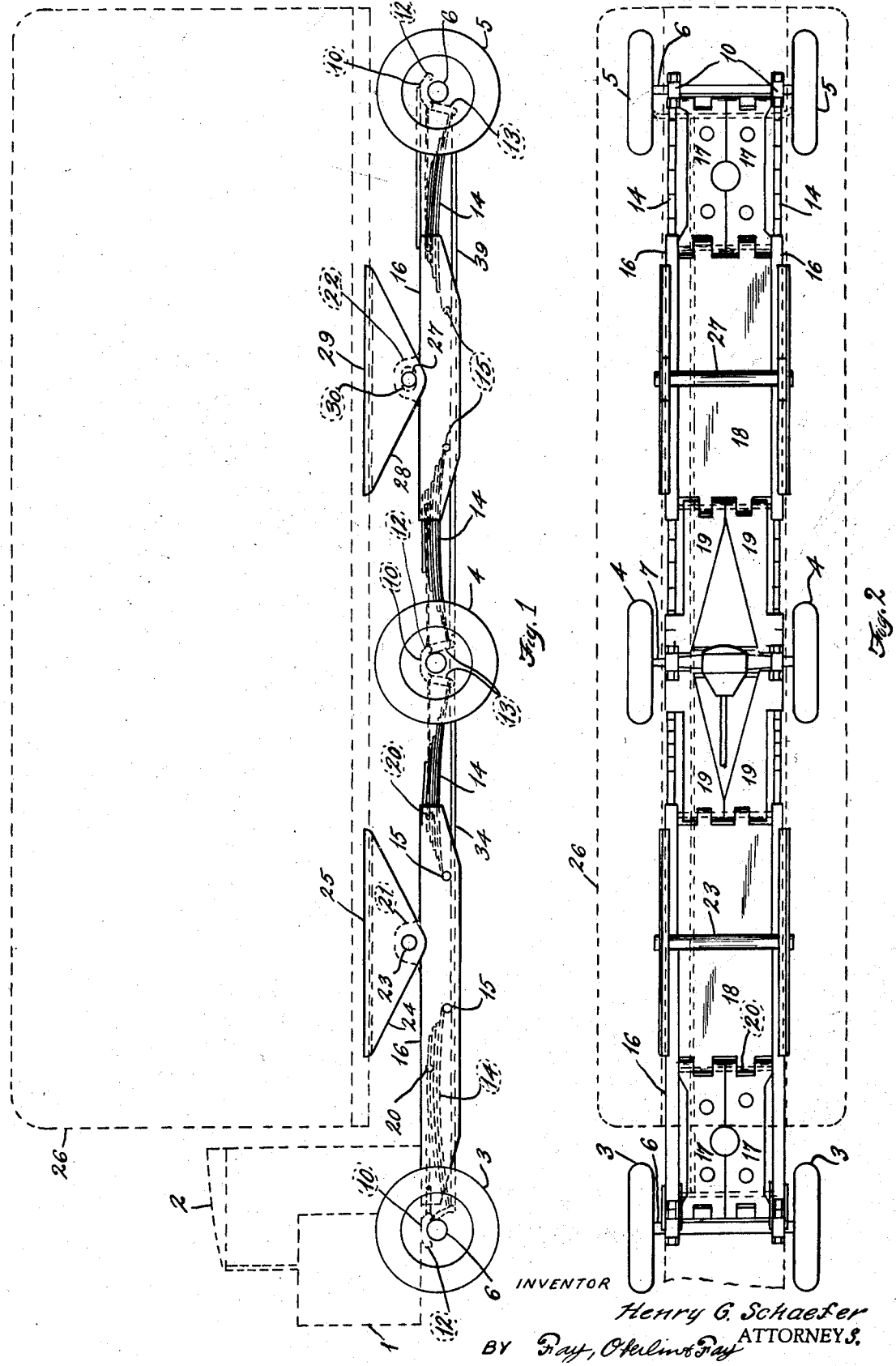
INVENTOR
Henry G. Schaefer
BY Fay, Oberlin & Fay
ATTORNEYS.

March 3, 1936.  H. G. SCHAEFER  2,032,721

VEHICLE

Filed July 10, 1933  3 Sheets-Sheet 2

INVENTOR.
Henry G. Schaefer
BY
Fay, Oberlin & Fay
ATTORNEYS

March 3, 1936.  H. G. SCHAEFER  2,032,721

VEHICLE

Filed July 10, 1933  3 Sheets-Sheet 3

INVENTOR.
Henry G. Schaefer
BY
Fay, Oberlin & Fay
ATTORNEYS.

Patented Mar. 3, 1936

2,032,721

UNITED STATES PATENT OFFICE 2,032,721

VEHICLE

Henry G. Schaefer, Lakewood, Ohio

Application July 10, 1933, Serial No. 679,695

5 Claims. (Cl. 280—106.5)

This invention relates as indicated to vehicles but has more particular reference to vehicles of the commercial type, such for example as tractor-trailers.

A primary object of the invention is to provide a vehicle of the character described in which the loads are evenly and properly distributed over the wheels of the vehicle, regardless of the contour of the roads over which the vehicle is traveling and in which the transmission of excessive stresses from chassis to the body of the vehicle is avoided and the useful life of the vehicle is considerably prolonged.

Another object of the invention is to provide a vehicle of the character described in which certain of the rear wheels are steered by or incidentally to the steering of the front wheels, whereby a shorter turning radius of the vehicle is secured, jack-knifing is avoided, tire wear is lessened, the operation and control of the vehicle made easier, and other ancillary advantages are secured.

To the accomplishment of the foregoing and related ends, said invention, then, consists of the means hereinafter fully described and particularly pointed out in the claims; the annexed drawings and the following description setting forth in detail certain forms of construction embodying the invention, such disclosed means constituting, however, but a few of various constructional forms in which the principle of the invention may be embodied.

In said annexed drawings:—

Figure 13:
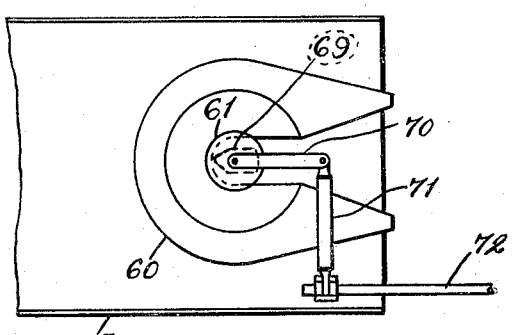
Figure 3:
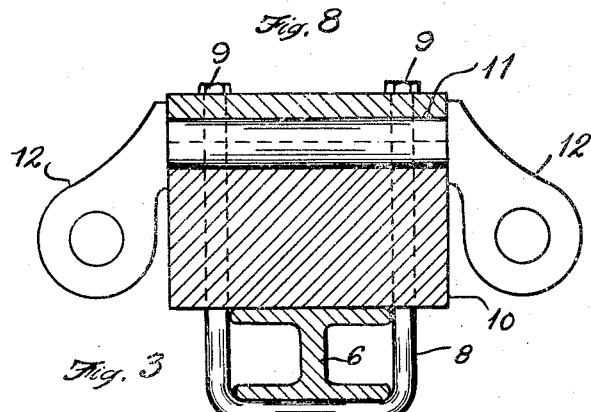
Figure 4:
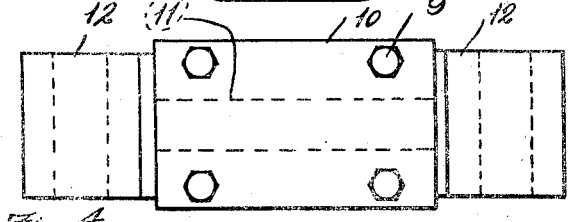
Figure 14:
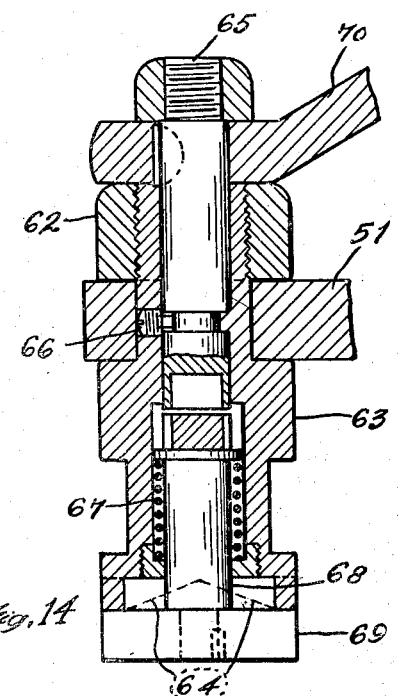
Figure 11:
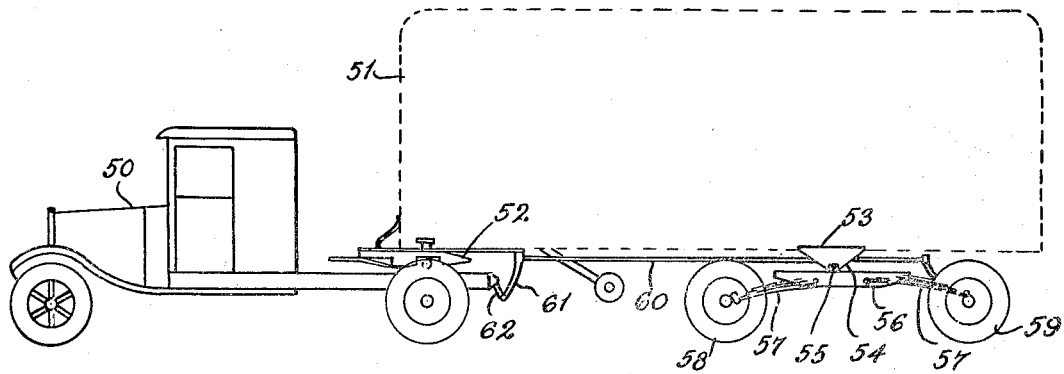
Figure 9:
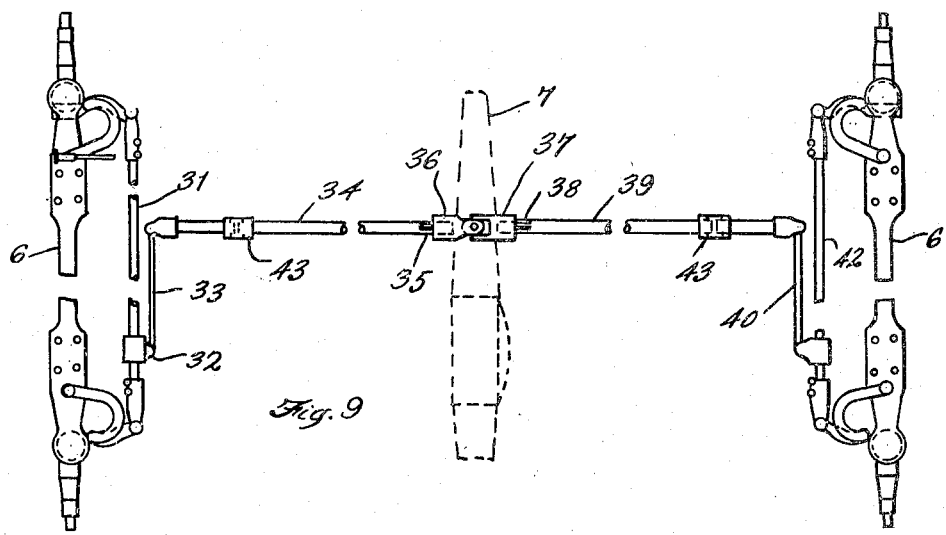
Figure 10:
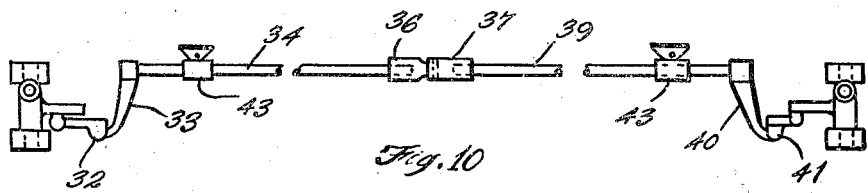
Figure 12:
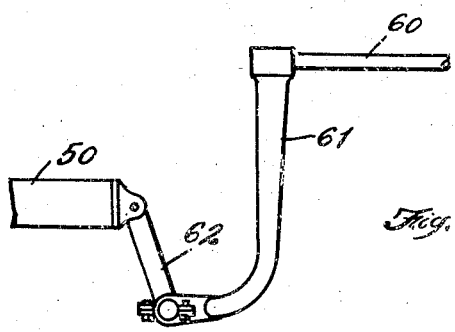

Fig. 1 is a side elevation of a vehicle embodying the invention; Fig. 2 is a bottom plan view of the vehicle; Figs. 3 and 4 are detailed views of the spring shackle mounting elements; Figs. 5, 6, 7, and 8 are views illustrating movements of various parts of the vehicle in passing over road obstructions; Figs. 9 and 10 are views of the steering mechanism used in vehicles of the type shown in Figs. 1 to 8 inclusive; Fig. 11 is a side elevation of a tractor-trailer embodying certain features of the invention; Fig. 12 is a detail view of a modified form of the steering mechanism for use in tractor-trailers; and Figs. 13 and 14 are detail views of a modified form of a mechanism for steering the rear wheels of the tractor.

Referring more particularly to that form of the invention shown in Figs. 1 to 10, inclusive, it will be seen that the vehicle is of the commercial type and comprises a chassis upon which is mounted the engine 1 and driver's cab 2, the chassis being provided with front wheels 3, intermediate driven wheels 4 and rear wheels 5. Secured to the front and rear axles 6 and to the axle housing 7 of the driven wheels, as by means of U-bolts 8 and nuts 9, are blocks 10, see Figs. 3 and 4, in which are mounted members 11 provided with perforated downwardly extending lugs 12 adapted to pivotally support spring shackles 13. It may be noted at this point that the members 11 are so mounted in the blocks 10 that they may oscillate to a slight extent transversely of the direction of movement of the vehicle.

Spring shackles 13 serve to pivotally support one end of cantilever springs 14, the opposite ends of these springs being pivotally mounted upon pins 15 which extend transversely from the side frames 16 of the chassis. Frames 16 are maintained in spaced relation by means of plates 17, 18 and 19 which are pivotally connected to shafts 20 extending between the frames 16.

The frames 16 are provided at their upper edges with upstanding ears 21 and 22. The ears 21 have journalled therein a shaft 23, which is rigidly secured to the downwardly extending flanges 24 of a member 25, to which the front portion of the vehicle body 26 is rigidly secured. The rear portion of the body 26 has rigidly secured thereto a member 29 having downwardly extending flanges 28 to which is rigidly secured the shaft 27, the shaft passing through apertures 30 in the ears 22. The apertures 30 in ears 22, through which the shaft 27 passes, are somewhat elongated so as to permit a limited degree of longitudinal movement of the rear frame 16 with respect to the body of the vehicle, for a purpose to be presently described.

Figure 6:
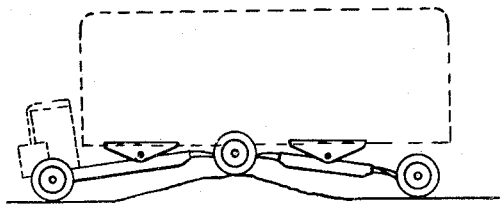
Figure 5:
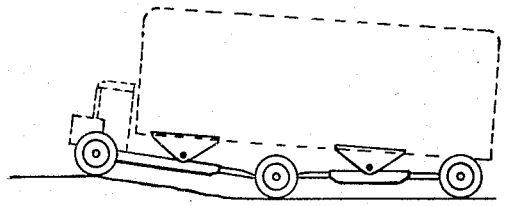
Figure 7:
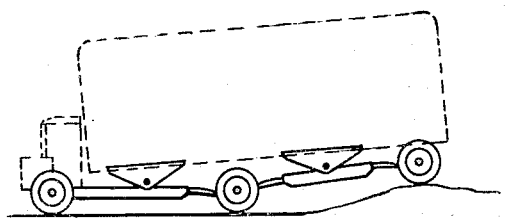

It will be readily seen that the articulated construction of the vehicle is such that when the wheels 3 pass over an obstruction in the road, as in Fig. 5, the intermediate driven wheels will not be elevated and consequenly the weight of the body will always be properly distributed over all of the wheels. Moreover, the provision of the elongated apertures in the ears 22 of the frames 16 prevents the transmission of excessive stresses from the chassis to the body of the vehicle, thereby preserving the life of such body as well as tending to keep it on a more even keel when the vehicle is driven over rough roads. The aforesaid advantages are also apparent when the intermediate and rear wheels of the vehicle pass over obstructions in the road, as in Figs. 6 and 7 respectively.

Figure 8:
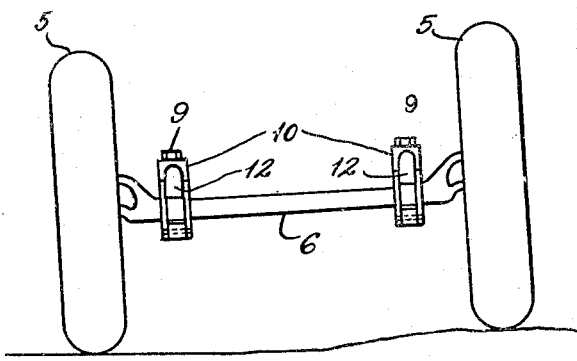

When, as shown in Fig. 8, the wheels at one side of the vehicle pass over an obstruction and the axles are thereby tilted, the pivotal mounting of the shackle supporting members 11 and the blocks 10 tends to prevent tilting of the body and thereby assist in maintaining the body on an even keel.

Provision has also been made for steering the rear wheels of the vehicle simultaneously with the front wheels. For this purpose the connector bar 31 of the front wheel steering mechanism has secured thereto adjacent one end a ball member 32 which is disposed within a socket in one end of a lever arm 33, the opposite end of this lever arm being rigidly secured to a torque rod 34 having a splined end 35 engaged in a socket member 36 of a universal joint. The other socket member 37 of the universal joint has received therein the splined end 38 of torque rod 39. Torque rod 39 has rigidly secured to its opposite end a lever arm 40, the lower end of which is formed as a socket for the reception of a ball 41 clamped to the connecter bar 42 of the rear wheel steering mechanism. It will be apparent that when the front wheels of the vehicle are turned, the rear wheels will be simultaneously steered, but in the opposite direction from the front wheels and that variations in the center to center distance between the front and rear axles of the vehicle due to passage of the front or rear wheels over obstructions in the road, as previously described, will be compensated for by the splined connection of torque rods 34 and 39 with the universal joint, so that steering may be effected at all times without danger of the torque rods binding in their bearing supports 43. By the use of a rear wheel steering mechanism, such as described, the vehicle may be steered within a much smaller radius than has heretofore been possible in commercial vehicles of this type, tire wear is considerably lessened, danger of jack-knifing is avoided and the operation and control of the vehicle is made easier.

In that form of the invention shown in Figs. 11 and 12 the vehicle comprises a tractor 50 and a semi-trailer 51, the forward end of the trailer being mounted in the usual manner on the pivotally mounted fifth wheel 52 of the tractor. The rear end of the trailer has secured thereto a plate 53 having depending flanges 54 carrying a shaft 55 which is pivotally mounted on frames 56 similar to the frames 16 in the previously described form of the invention. The frames 56 are mounted on cantilever springs 57 which are suspended from the axles of the wheels 58 and 59 in the same manner that the springs are suspended from the axles of the wheels in the previously described form of construction. By mounting the rear end of the tractor in this manner, all of the advantages to which reference has been made in connection with the previously described form of the invention are secured. In this form of the invention, the rear wheels 59 are steered by means of a torque rod 60 having rigidly secured to one end thereof a lever 61 which has a ball and socket connection with a link 62, which in turn has a ball and socket connection with the rear end of the tractor frame. When the tractor is turned, the turning effect is transmitted through the torque rod 60 to the rear wheels of the trailer so that these are steered simultaneously with the front wheels of the tractor.

In Figs. 13 and 14, I have illustrated more or less diagrammatically means for communicating the steering effect of the tractor to the rear wheels of the trailer through the king pin connection of the trailer with the fifth wheel of the tractor. In this form of the invention, the tractor 50 is provided with a fifth wheel 60a, such fifth wheel having a centrally disposed non-rotatable block 61a therein provided with a V-shaped recess opening toward the rear end of the tractor. The trailer 51 in this case has rigidly mounted thereon, as by means of a nut 62a, a hollow pin 63 having cam edges 64 at the lower end thereof. Disposed within the pin 63 is a rotatable clutch member 65 which is restrained against axial movement by a set screw 66, and which normally has engaged therewith as by means of a spring 67, a cooperating clutch member 68. The member 68 is provided at its lower end with a wedge block 69 which is adapted to enter the V-shaped recess in the block 61a when the tractor is backed under the trailer. The member 65 has keyed thereto a lever 70 which is secured at its other end to a transverse lever 71 connected to a torque rod 72. When the tractor is turning, as in going around a corner, the turning effect of the tractor is communicated to the rear wheels of the trailer through the wedge block 69, clutch members 65 and 68, levers 70 and 71 and torque rod 72 to the rear wheels of the trailer, which are thus steered in a manner similar to that shown in Figs. 9 and 10. In order to avoid excessive strains on the various parts of the aforesaid steering mechanism, provision is made for separating the clutch members 65 and 68 when the angle between tractor and trailer is such that strains are likely to result. This separation is effected by the wedge block 69 riding up on the cam edges 64 as will be apparent from Fig. 14.

Other modes of applying the principle of my invention may be employed instead of the one explained, change being made as regards the structure herein disclosed, provided the elements stated by and of the following claims or the equivalent of such stated elements be employed.

I therefore particularly point out and distinctly claim as my invention:—

1. In a vehicle of the character described, a body, a chassis comprising longitudinally spaced frames disposed below said body, a pivotal connection between said body and one of said frames and a pin and slot connection between said body and the other frame whereby a limited degree of relative longitudinal movement between said body and said last-named frame is permitted.

2. In a vehicle of the character described, a body, a chassis comprising longitudinally spaced substantially inflexible frames disposed below said body, a pivotal connection between said body and one of said frames and a pin and slot connection between said body and the other frame whereby a limited degree of relative longitudinal movement between said body and said last-named frame is permitted.

3. In a vehicle of the character described, a body, a chassis comprising longitudinally spaced frames disposed below said body, said frames having a limited degree of pivotal movement with respect to each other and about an axis substantially midway therebetween, a pivotal connection between said body and one of said frames and a pin and slot connection between said body and the other frame whereby a limited degree of relative longitudinal movement between said body and said last-named frame is permitted.

4. In a vehicle of the character described, a body, a chassis comprising longitudinally spaced frames disposed below said body, similarly spaced members rigidly secured to said body and each provided with downwardly extending flanges, shafts carried by said flanges, a pivotal connection between one of said shafts and one of said frames, and a slotted connection between the other shaft and the other frame whereby a limited degree of relative longitudinal movement between said body and said last-named frame is permitted.

5. In a vehicle of the character described, a body, a chassis comprising longitudinally spaced pairs of frames disposed below said body, said frames provided with upstanding ears, similarly spaced members rigidly secured to said body and each provided with downwardly extending flanges, shafts carried by said flanges, a pivotal connection between one of said shafts and the ears of one pair of frames and a slotted connection between the other shaft and the ears of the other frame whereby a limited degree of relative longitudinal movement between said body and said last-named frame is permitted.

HENRY G. SCHAEFER.